United States Patent [19]

Piera Bermejo

[11] Patent Number: 5,672,089

[45] Date of Patent: Sep. 30, 1997

[54] MARBLE

[76] Inventor: Antonio Piera Bermejo, Maduixer, 30, Barcelona, Spain, 08023

[21] Appl. No.: 662,073

[22] Filed: Jun. 12, 1996

[30] Foreign Application Priority Data

Jun. 14, 1995 [ES] Spain .................. 9501690 U

[51] Int. Cl.$^6$ ................. A63H 1/22; A63H 17/00
[52] U.S. Cl. ............. 446/243; 446/236; 446/431; 40/327; 40/661; 473/594; 473/DIG. 14
[58] Field of Search ................. 446/243, 128, 446/236, 431; 40/327, 661; 273/DIG. 14, 58 A, 58 F, 58 R; 428/11; 473/594

[56] References Cited

U.S. PATENT DOCUMENTS

| | | | |
|---|---|---|---|
| 2,516,367 | 7/1950 | Cloud ................. | 466/244 |
| 2,704,211 | 12/1955 | Decepoli ................. | 273/128 |
| 3,207,514 | 9/1965 | Vickery ................. | 273/DIG. 14 X |
| 3,406,972 | 10/1968 | Wong ................. | 273/128 |
| 4,116,439 | 9/1978 | Chavarria et al. ................. | 40/327 X |
| 4,214,753 | 7/1980 | Haber et al. ................. | 40/327 X |

*Primary Examiner*—Robert A. Hafer
*Assistant Examiner*—D. Neal Muir
*Attorney, Agent, or Firm*—Richard M. Goldberg

[57] ABSTRACT

A marble includes a ball of transparent material having an equatorial plane and a colored tone, and a sheet held inside the ball at the equatorial plane, the sheet having at least one picture on one side and a score on another other side thereof. The ball is formed by two hemispheres, each having a flat surface along the equatorial plane, the sheet is sandwiched between the two hemispheres, and the two hemispheres are welded together.

4 Claims, 1 Drawing Sheet

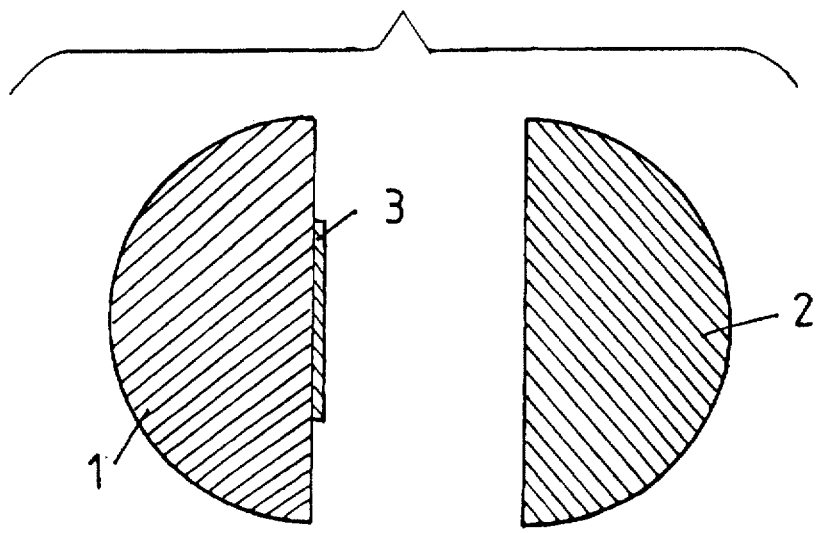
FIG.1
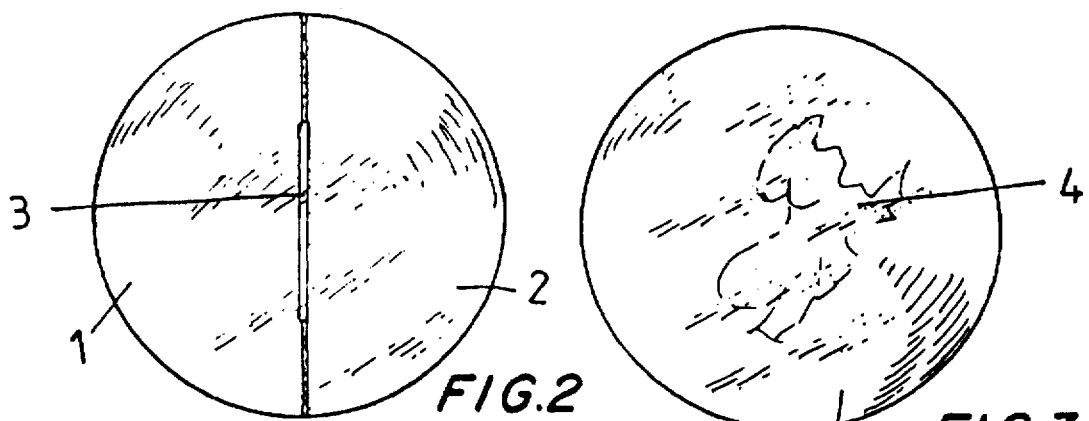
FIG.2
FIG.3
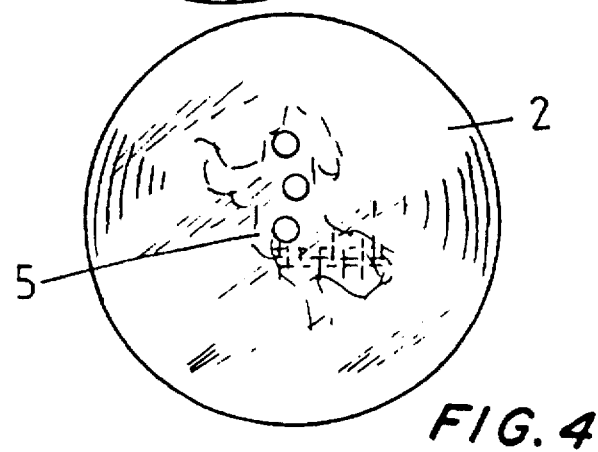
FIG.4

MARBLE

BACKGROUND OF THE INVENTION

The present invention refers to a new improved marble which provides the traditional game with different possibilities in order to obtain new games other than those currently played with marbles.

From time immemorial, children have used in their games small balls of clay, glass or any other hard material with which they could play different games, either trying to get as close as possible to a wall or any other option. These balls are commonly known as marbles.

SUMMARY OF THE INVENTION

With the new improved marble which constitutes the basis of this invention, it is intended to define a different type of ball for the same purpose of leisure, but the constitution of which enables it to be used for games other than those habitually played.

In order to achieve this end, this improved marble will be produced in a transparent material which may be given different tones, but will always maintain its transparent quality. Inside it, at the circle of its equator will be placed a sheet with items on both sides so that when the marble has been perfectly closed and the two halves which form it welded together, two different views are observed through the transparent material, depending on the position from which one looks.

In general, the figure which appears on one side could feature people, animals, situations, etc., while the other side will normally show numbers with the purpose of defining points to be won in the game.

In this way, thanks to the existence of the new improved marble, a new game can be played in which different marbles are used, each with different pictures and different numbers of points, depending on which one the player has in his hands and throws, giving him different scores which will enable him to win the game; or any other purpose which may be achieved with the new improved marble which is, per se, the object of the present invention.

BRIEF DESCRIPTION OF THE DRAWINGS

In order to facilitate comprehension of the explanation, a page of drawings is enclosed with the present statement, by way of illustration and not being in any way restrictive, representing an example of a new improved marble according to the principles set forth in the claims.

In the drawings:

FIG. 1 shows an elevation section of the new improved marble described, subdivided into the two halves which form it.

FIG. 2 shows an elevation view of the said marble once assembled.

Finally, FIGS. 3 and 4 show top views of the marble in symmetrical relation to one another.

DETAILED DESCRIPTION

As shown in said drawings, the new improved marble is composed of two semispheres -1- and -2- produced in a transparent material, with a sheet of paper or similar -3- placed between them before they are welded together to achieve the definitive form. On one side of the sheet is a picture -4-, while the other -5- represents a score, which will be different with each different picture.

Once the unit has been welded, it will be as represented in FIGS. 3 and 4 so that, when a player throws the marble, it will show either the picture side or the points side, enabling different games to be played, all within the line which currently dominates children's play.

All that does not affect, alter, change or modify the essence of the new marble described herein which may be varied in the current invention.

I claim:

1. A marble comprising:
   a ball of transparent material having an equatorial plane, said ball being comprised of two hemispheres, each having a flat surface along said equatorial plane, and said two hemispheres being welded together, and
   a paper sheet held inside said ball at said equatorial plane and sandwiched between said two hemispheres, said sheet having at least one picture on one side and a score on another other side thereof.

2. A marble according to claim 1, wherein said ball has a colored tone.

3. A method of forming a marble, comprising the steps of:
   forming two hemispheres, each of a transparent material and each having a flat surface along an equatorial plane thereof,
   sandwiching a paper sheet between said equatorial planes of said two hemispheres, said sheet having at least one picture on one side and a score on another other side thereof, and
   welding said two hemispheres together to form the marble with said sheet encapsulated therein.

4. A method according to claim 3, wherein at least one of said hemispheres has a colored tone.

\* \* \* \* \*